Aug. 17, 1937.　　　L. CONTRATTO　　　2,090,249
TRACTOR
Original Filed May 25, 1934
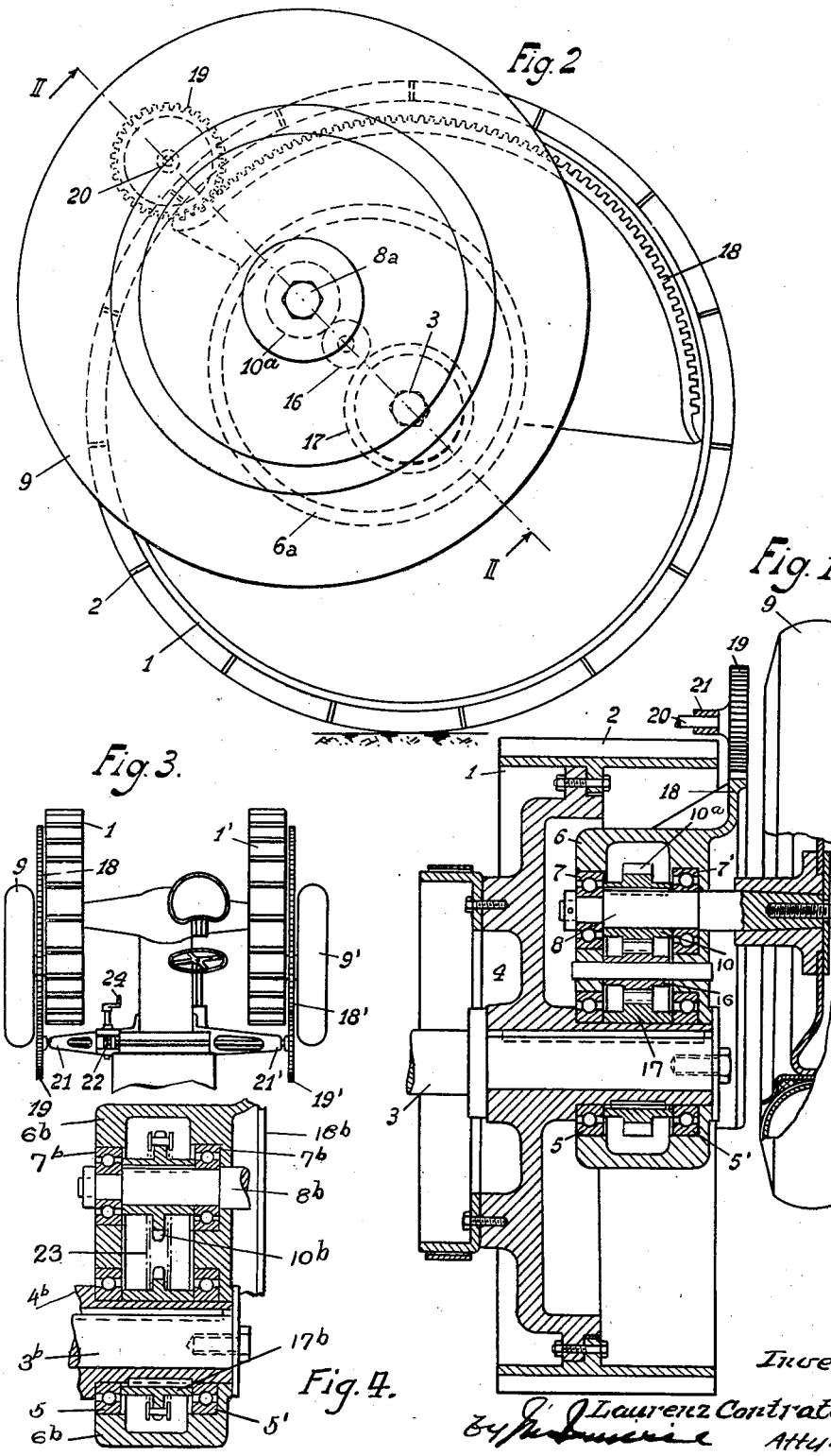

Patented Aug. 17, 1937

2,090,249

UNITED STATES PATENT OFFICE 2,090,249

TRACTOR

Laurenz Contratto, Sisikon, Switzerland

Application May 25, 1934, Serial No. 727,487. Renewed July 13, 1937. In Germany May 27, 1933

2 Claims. (Cl. 180—15)

My invention relates to improvements in traction engines, motor ploughs and kindred motor driven agricultural implements collectively hereinafter called tractors,—and more especially to improvements in tractors of the change wheel type viz. having two pairs of traction wheels, which can be alternatively used: One pair of wheels of relatively large diameter having wide rims and preferably cleats attached thereon, hereinafter briefly called farming wheels, and being designed to travel on soft soil as in ploughing, ditching etc., and another pair of smaller wheels, designed to carry the tractor over hard roads as in hauling and the transportation of goods.

The primary object of this invention is to provide an improved change wheel structure for tractors, so designed that the farming wheels can be speedily thrown out of operation and exchanged by the driver of the tractor for the road wheels, without the aid of tools such as wrenches, tongues of special design etc. and in a much shorter period of time than known with tractors used heretofore.

In connection therewith the invention aims at providing a change wheel structure of improved design for tractors, in which the farming wheels are structurally so associated with the road wheels that the latter can be lifted to a relatively great height above the ground, and so that the tractor can be freely driven over deeply ploughed ground and also over extraordinarily soft soils— including peat, marshland etc. into which the tractor may sink to a considerable depth, without incurring the risk of the road wheels coming into contact with clods or other obstructions.

Another object of the invention is to so design the change wheel structure, that the tractor, while running on its road wheels is capable of attaining an unusually high speed, higher than known with tractors of the type under consideration used heretofore.

Other objects of the invention will become incidentally apparent hereinafter to practitioners in this field.

The nature and scope of the invention are briefly outlined in the appended claims and will be more thoroughly understood by the following specification taken together with the accompanying drawing in which:

Fig. 1 is a section taken vertically through a change wheel structure for tractors designed according to this invention and shown by way of an example, Fig. 2 is a side elevation of the change wheel structure shown in Fig. 1, Fig. 3 is a plan showing a tractor which is provided with wheels of the design shown in Figs. 1 and 2, Fig. 4 is a fragmentary section showing a slightly modified means for driving the secondary driving shaft from the primary driving shaft.

The change wheel structure of the present invention utilizes the spindles of the rear axles 3 as primary driving shafts. A wheel 1, hereinafter termed the farming wheel, is provided with a tubular hub 4 which is keyed to each spindle of the primary driving shaft at each end. The wheel 1 is preferably provided with cleats 2 on its rim and is of sufficient width to travel on soft ground. A hollow member 6, hereinafter called the gear box, is provided on the hub 4 of the farming wheel by means of ball bearings 5, 5', the gear box being mounted in eccentric position with respect to the hub, so as to be capable of moving about the same, that is to change its angular position relative to the farming wheel. A rotary shaft 8, hereinafter referred to as the secondary shaft, is journaled by means of ball bearings 7, 7' in the gear box 6, the secondary shaft being arranged in spaced parallel relation to the primary shaft or axle spindle 3. A second traction wheel 9, hereinafter referred to as the road wheel, is removably secured to the secondary shaft and is preferably, as shown, provided with a pneumatic tire. A pinion 10 is fixed on the secondary shaft 8 within the gear box and meshes through an intermediate pinion 16 rotatably mounted upon a shaft supported in the gear box with a pinion 17 secured upon the hub 4 of the farming wheel. The relation of the pinions is such that the driving rotation of the secondary shaft and thus of the road wheel through operation of the farming wheel is relatively increased. As the gear box is capable of being swung about the hub of the farming wheel as an axis by means to be described, it is apparent that through the use of such means either the farming wheel or road wheel may serve as ground engaging wheels.

Means are provided for swinging the gear box 6 into the respective positions necessary to utilize either the wheel 1 or the wheel 9 as the ground wheel. It is understood that the parts are duplicated on each side of the machine and that the gear boxes on the respective sides are simultaneously operated to utilize the wheels 1, 1' (Fig. 3) or the wheels 9, 9', as contemplated. The operating means include flanges 18, 18' on the respective sides of the machine which form extensions of the respective gear boxes and are provided with teeth in the form of a rack. Pinions 19, 19' on the respective sides of the machine cooperate with these racks and are operated through the medium of a transverse shaft 20 supported at its ends in frames 21, 21', mounted on the body of the tractor, and driven by worm gearing 22 through the medium of a handle 24 which, as illustrated in Fig. 3, is conveniently accessible from the driver's seat.

In the construction shown in Fig. 4, the main axle spindles, here indicated at 3b, have keyed thereto the hub 4b of the farming wheel, as in the preferred form. A gear box 6b, similar to the preferred form, supports the secondary shaft 8b in spaced parallel relation to the axle spindles 3b, both farming wheel hub and secondary shaft being supported in conventional bearings, indicated at 7b. It is understood, though not illustrated in this figure, that the road wheel is carried by the secondary shaft 8b, as in the preferred form. The modification illustrated in Fig. 4 consists in the utilization of sprocket wheels 10b and 17b secured respectively to the secondary shaft 8b and to the hub 4b of the farming wheel and which are connected for driving purposes by a sprocket chain indicated at 28.

What I claim is:

1. Change wheel structure for tractors comprising a primary driving shaft, a farming wheel adapted to travel on soft ground, a tubular hub on said farming wheel, said hub being keyed to said primary shaft, a gear box mounted on said hub in eccentric position to the latter and being adapted to be swung around said hub so as to change its position angularly relatively to said farming wheel, a secondary driving shaft journalled in said gear box, a road wheel secured to said secondary shaft, gearing co-operatively inter-connecting the said primary and secondary shaft, a toothed flange projecting from said gear box and presenting an arc-shaped toothed rack, a pinion gearing with said rack, a shaft on which said pinion is keyed and a worm gear under the control of the driver, co-operatively associated with said pinion shaft, whereby either the farm wheel or road wheel may be utilized as the ground wheel at will.

2. Change wheel structure for tractors comprising a primary driving shaft, a farming wheel adapted to travel on soft ground, a tubular hub on said farming wheel, said hub being keyed to said primary shaft, a gear box mounted on said hub in eccentric position to the latter and being adapted to be swung around said hub so as to change its position angularly relatively to said farming wheel, a secondary driving shaft journalled in said gear box, a road wheel secured to said secondary shaft, a gear keyed to said hub, a gear attached to said secondary shaft, an intermediate gear co-operatively connecting the gears on the hub and on the secondary shaft, a toothed flange projecting from said gear box and presenting an arc-shaped toothed rack, a pinion gearing with said toothed flange, a shaft on which said pinion is keyed and a worm gear under the control of the driver, co-operatively associated with said pinion shaft, the arrangement being such that when the gear box is moved in one direction into one extreme position the farming wheel is brought into contact with the ground and the road wheel is raised from the ground, whilst when the gear box is moved in the opposite direction to the other extreme position the road wheel is brought into contact with the ground, and the farming wheel is raised from the ground, the farming wheel and road remaining in positive driving relationship in all positions.

LAURENZ CONTRATTO.